United States Patent [19]
Gordon, II et al.

[11] 4,165,155
[45] Aug. 21, 1979

[54] AMPLITUDE MODULATION OF LIGHT BEAM

[75] Inventors: Joseph G. Gordon, II; Glenn T. Sincerbox, both of San Jose, Calif.

[73] Assignee: International Business Machines Corporation, Armonk, N.Y.

[21] Appl. No.: 890,171

[22] Filed: Mar. 27, 1978

[51] Int. Cl.² .............................................. G05D 25/00
[52] U.S. Cl. .................................................... 350/285
[58] Field of Search ................................. 350/285, 359

[56] References Cited
U.S. PATENT DOCUMENTS

| | | | |
|---|---|---|---|
| 2,565,514 | 8/1951 | Pajes | 350/285 |
| 2,997,922 | 8/1961 | Kaprelian | 350/285 |
| 3,156,825 | 11/1964 | Lines | 350/285 X |
| 3,376,092 | 4/1968 | Kushner et al. | 350/285 |
| 3,514,183 | 5/1970 | Robedeau | 350/285 |
| 3,556,638 | 1/1971 | Banks et al. | 350/285 |
| 3,559,101 | 1/1971 | Parker et al. | 350/285 X |
| 3,565,514 | 2/1971 | Bate et al. | 350/285 |
| 3,586,872 | 6/1971 | Tien | 307/88.3 |
| 3,832,567 | 8/1974 | Jacques et al. | 307/88.3 |
| 3,983,406 | 9/1976 | Lax et al. | 307/88.3 |

*Primary Examiner*—F. L. Evans
*Attorney, Agent, or Firm*—Joseph E. Kieninger

[57] ABSTRACT

An optical modulator suitable for use with a collimated light beam having a moderate cross section and a fast response time and operational at relatively low voltage includes, for example, a glass prism and a smooth metal surface that are separated by an adjustable gap. The gap is filled with a medium, for example, air, having an index of refraction lower than the prism. A beam of monochromatic light is passed into the prism at a specific angle of incidence to undergo total internal reflection at the glass prism-gap interface. A change of approximately 1 micron in the thickness of the gap is sufficient to change the reflectivity from greater than 95% to essentially zero. The size of the gap is mechanically adjusted and this mechanical device determines the frequency response of the light modulation.

11 Claims, 2 Drawing Figures

AMPLITUDE MODULATION OF LIGHT BEAM

DESCRIPTION

TECHNICAL FIELD

This invention relates to an optical device, and more particularly to a device and method for the modulation of the amplitude of a light beam.

It is a primary object of this invention to provide an improved optical modulator.

It is another object of this invention to provide an improved method of modulating the amplitude of a monochromatic light beam.

It is still another object of this invention to provide a method and device for modulating the amplitude of a light beam having a moderate cross section while having a fast response time.

It is yet still another object of this invention to provide a method and device for modulating the amplitude of the monochromatic light beam while using a relatively low voltage.

It is a further object of this invention to provide a device that serves as a variable light attenuator.

BACKGROUND ART

The present methods of modulating a beam of light include mechanical shutters, electro-optic devices and acousto-optic devices. Mechanical modulators are inherently slow since they require the movement of mechanical parts over distances of the order of millimeters. The electro-optic devices involve means for rotating the polarization state of an incident light beam. This is inherently a high voltage process, on the order of several thousands of volts, which causes complications in the electronics and also results in a slower response.

The acousto-optic modulator operates by deflecting an incident light beam by diffraction from a periodic refractive index variation introduced into an optically transparent material by an acoustic wave. These are inherently small aperture devices because the finite velocity of the acoustic wave requires the light beam to have a small cross section in order for the device to have a fast response time.

The patent to Rabadeau U.S. Pat. No. 3,514,183 describes a switchable total internal reflection light deflector which could be used as a light modulator. This deflector has a piezoelectric crystal which is used to flex a glass plate causing its surface to be brought into intimate contact with a prism. The light undergoes frustrated total internal reflection when the plate and prism are less that $\lambda/50$ apart, that is, of the order of 100 Å. This means they are in substantial contact with one another. The forces of attraction between prism and plate are of such a magnitude that they have to be literally peeled apart. This attraction causes cold welding of the glass surfaces and device failure results after a few million cycles. Since the glass plate is forced into and out of optical contact with the prism, the life of the deflector is also limited by the abrasion of the interface surfaces.

BRIEF DESCRIPTION OF THE DRAWINGS

In the accompanying drawings forming a material part of this disclosure.

DISCLOSURE OF INVENTION

For further understanding of the invention and of the objects and advantages thereof, reference will be had to the following description and accompanying drawings, and to the appended claims in which the various novel features of the invention are more particularly set forth.

An optical modulator suitable for use with a collimated light beam having a moderate cross section and a fast response time and operational at relatively low voltage includes, for example, a glass prism and a smooth metal surface that are separated by an adjustable gap. The gap is filled with a medium, for example, air, having an index of refraction lower than the prism. A beam of monochromatic light is passed into the prism at a specific angle of incidence to undergo total internal reflection at the glass prism-gap interface. A change of approximately 1 micron in the thickness of the gap is sufficient to change the reflectivity from greater than 95% to essentially zero. The size of the gap is mechanically adjusted and this mechanical device determines the frequency response of the light modulation.

BEST MODE FOR CARRYING OUT THE INVENTION

Figure 1:
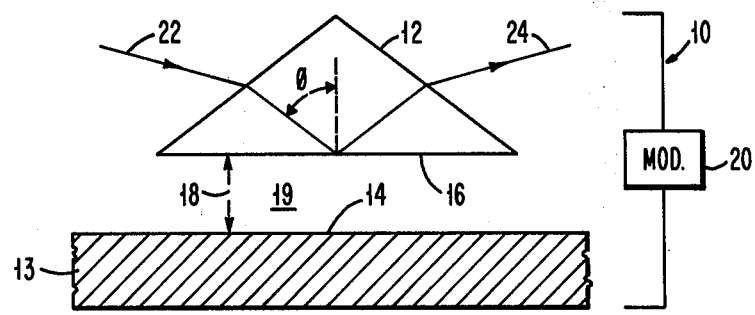
FIG. 1 is a view partly in cross section and partly schematic of the optical modulator of this invention.

We first describe the structure of an optical modulator according to the invention. Referring to FIG. 1, the optical modulator 10 in accordance with this invention includes a prism 12 and a substrate 13 having a smooth surface 14. The prism 12 can be any optically transparent material and have any combination of plane or curved surfaces provided that it have at least one plane surface. For example, prism 12 may have a triangular shape as shown in FIG. 1. It could also have a hemicylindrical, trapezoidal shape, etc. Suitable prism 12 materials include glasses, plastics, natural or synthetic crystals, and the like. The lower surface 16 of prism 12 is separated from the smooth surface 14 by a gap 18. The gap 18 is filled with a medium 19 having a dielectric constant less than the prism 12. Air is an example of a suitable medium 19. Medium 19 may be any gas, liquid or compressible solid as long as the dielectric constant requirement is fulfilled.

The substrate 13 is of a material selected so that the energy in reflected beam 24 is a function of the thickness of the gap 18. This effect is described by the well known Fresnel equations and arises when the surface 14 has a negative dielectric constant whose magnitude is greater than that of the medium 19. These conditions are usually satisfied by most metals. In some spectral regions certain nonmetallic materials such as semiconductors and organic solids may also satisfy the requirements. Materials which have been tested and work include copper, silver, gold, aluminum and rhodium.

The thickness of the gap is changed with a mechanical device 20, for example, but not restricted to a, piezoelectric transducer. Transducers are available which will produce a 1 micron excursion with application of 70 to 80 volts of drive. A beam of linearly polarized collimated monochromatic light 22 is passed into the prism 12 to form an angle of incidence inside the prism, $\phi$ and is reflected to form beam 24.

EXAMPLE 1

Figure 2:
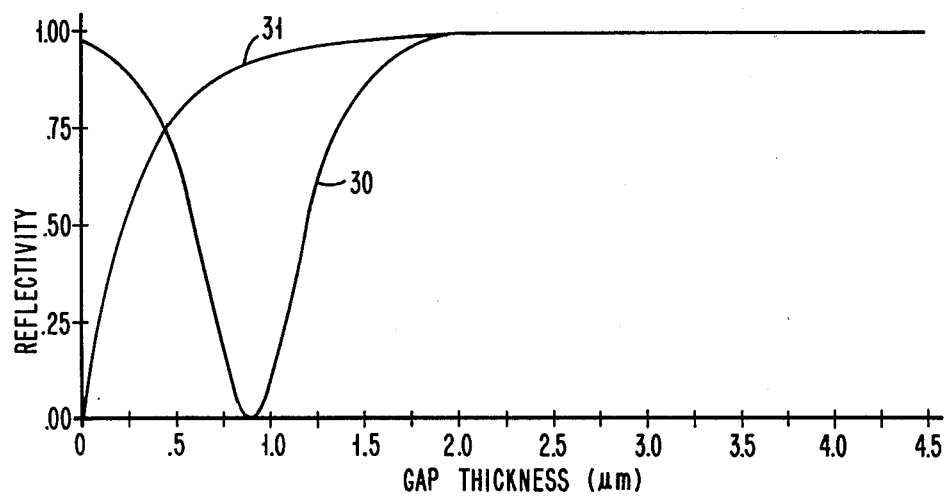
FIG. 2 illustrates the variations in reflectivity for prior art devices and the optical modulator of this invention.

A typical variation of reflectivity, R, with gap thickness $d_g$ is shown in FIG. 2 as curve 30. This is for a glass prism $\epsilon_p = 2.297$, a gap containing air $\epsilon_g = 1.0$ and a silver surface $\epsilon_s = -16.4 - i.54$ ($\epsilon$ = dielectric constant). The wavelength of the incident radiation is 632.8 nm and the angle of incidence, $\phi$, is 47.13°. As is evident in FIG. 2, a change in the dimensions of the air gap of 1 um is sufficient to alter the reflectivity from substantially 100% to zero. Included in FIG. 2 is a curve 31 representing the prior art switchable total internal reflection light deflector described in U.S. Pat. No. 3,514,183. It is to be noted that the prior art device requires contact, i.e., a substantially zero gap, to undergo frustrated total internal reflection. In contrast, as shown by the curve 30, the optical modulator of example 1 having a glass prism, an air gap and a silver substrate exhibits a minimum reflectivity at a finite distance,, i.e., about one micron.

INDUSTRIAL APPLICABILITY

The advantages of the optical modulator in accordance with this invention are that the size of the beam is immaterial, being limited entirely by the size of the reflecting surface. The beam only needs to be collimated. Another advantage is that this device is applicable over a wide range of optical frequencies. It is only necessary to choose a material with a suitable dielectric function. A further advantage is that a relatively low drive voltage is required, a voltage substantially less than the prior art electro optical devices.

Optical modulators made in accordance with this invention are useful in most applications where optical modulator or attenuator devices can be used. For example, they may be used in beam addressed memories or displays, optical communication, optical printers, spectrophotometers, and photometers.

Another embodiment of the optical modulator employs a multiple reflection element replacing prism 12 in FIG. 1. Multiple interactions would decrease the physical excursion required of the modulating element and hence increase the upper frequency limit and reduce the drive requirements for a given modulation amplitude.

A further embodiment utilizes the above described multiple reflection element in conjunction with a plurality of independent gap modulating elements to permit simultaneous modulation at several frequencies or by several independent signal sources.

While I have illustrated and described the preferred embodiment of my invention, it is understood that I do not limit myself to the precise constructions herein disclosed and the right is reserved to all changes and modifications coming within the scope of the invention as defined in the appended claims.

We claim:
1. An optical device comprising:
   an optically transparent first material having a first plane surface,
   a second material having a second plane surface with a negative dielectric constant facing said first surface to form a gap therebetween,
   a medium filling said gap and having a dielectric constant whose magnitude is less than that of said first material, and
   means for changing the thickness of said gap wherein the optical thickness of the gap determines the reflectivity of a monochromatic linearly polarized light beam that is passed into said first material and that undergoes total internal reflection at the interface between said first surface and said medium.
2. A device as described in claim 1 wherein said first material is a prism having a triangular shape.
3. A device as described in claim 1 wherein said first material is a prism having a hemicylindrical shape.
4. A device as described in claim 1 wherein said second plane surface is a metal.
5. A device as described in claim 4 wherein said second plane surface is a metal taken from the group consisting of copper, silver, gold, aluminum and rhodium.
6. A device as described in claim 1 wherein said medium is a gas.
7. A device as described in claim 6 wherein said gas is air.
8. A device as described in claim 1 wherein said means is a mechanical device.
9. A device as described in claim 4 wherein said means is a piezoelectric transducer.
10. A method of modulating the amplitude of a monochromatic light beam in an apparatus having a smooth metal surface separated from a glass prism by a gap that is filled with a material having an index of refraction that is lower than the glass prism comprising the steps of:
    passing a monochromatic light beam at an angle of incidence into said glass prism to undergo total internal reflection at the glass prism-gap interface, and
    changing the thickness of the gap to change the reflectivity.
11. The method as described in claim 10 including the step of providing a gap filled with air.

* * * * *